April 13, 1954 F. KRESS 2,675,542
SYNCHRO ZERO INDICATOR
Filed May 25, 1953 3 Sheets-Sheet 1

INVENTOR.
Frank Kress
BY
Harold F. Scribner
ATTORNEY

April 13, 1954     F. KRESS     2,675,542

SYNCHRO ZERO INDICATOR

Filed May 25, 1953     3 Sheets-Sheet 2

INVENTOR.
Frank Kress
BY
Harold F. Sinton
ATTORNEY

April 13, 1954 F. KRESS 2,675,542
SYNCHRO ZERO INDICATOR
Filed May 25, 1953
3 Sheets-Sheet 3

INVENTOR.
Frank Kress
BY
Harold F. Levine
ATTORNEY

Patented Apr. 13, 1954

2,675,542

UNITED STATES PATENT OFFICE 2,675,542

SYNCHRO ZERO INDICATOR

Frank Kress, Fords, N. J., assignor to Stavid Engineering, Inc., Plainfield, N. J., a corporation of New Jersey Application May 25, 1953, Serial No. 357,099

14 Claims. (Cl. 340—315)

This invention relates to synchro mechanisms and more particularly to synchro motors, generators, differential motors and generators, and synchro control transformers and has for its primary objective to render available a compact device by the aid of which mechanisms of the above character and the systems in which they are used may be zeroed and aligned more accurately and efficiently than has been possible heretofore.

In general, a synchro is a device resembling a small electric motor. It consists essentially of a rotor element and a stator element, constructed to operate on single phase alternating current service. Ordinarily the stator element is equipped with three windings or coils spaced 120° apart, and the rotor, which is mounted on a shaft and revolves within the stator, is provided with a single winding. When the rotor winding is energized a field of magnetic flux is created which induces voltages in the stator windings. The magnetic flux varies sinusoidally with time at line frequency hence the current induced in the stator windings is also alternating in character. The magnitude of the voltage induced in any one stator coil depends upon the orientation of the rotor coil axis relative to the axis of that one stator coil. Maximum voltages are induced when the aixs of the rotor coil and the axis of a given stator coil are parallel aligned and is zero when the one is perpendicular to the other.

As the rotor shaft of a generator is turned the induced voltage in any one coil of the stator is caused to modulate from maximum (when the coil axes are parallel) to zero (when the coils are perpendicular) with a reversal in phase occurring in the stator coil after the rotor passes through the perpendicular position. This varying of induced voltage occurs in the three coils of the stator sinusoidally and progressively, and the sum of the voltages in the three coils is a zero value for each position of the rotor.

In practice it is customary to employ at least two synchros in a system and to connect the stator terminals of the one which may be called the generator with corresponding stator terminals of the other which may be called the motor, and corresponding rotor terminals together and to a source of alternating current.

A mechanical turning of the rotor shaft of the generator angularly from one position to another induces voltages of unequal magnitude in the stator windings which are transmitted to the respective windings of the synchro motor and causes the rotor of the latter to take up point by point angular positions parallel to the position of the rotor of the generator. Such a combination of generator and motor is useful in transmitting information from one point to another where a mechanical connection between is not feasible, and currently has many applications, e. g., in the radar field for moving a deflection coil in correspondence with the angular displacement of the antenna.

In synchro system applications it is important not only that the angular position of the rotor of the motor (receiver) correspond with the angular position of the rotor of the generator (transmitter) but that a standard electrical method be used to establish the zero position of each shaft. When a synchro shaft is in the zero position as a result of applying "electrical zero" voltages the shaft position is said to be at electrical zero.

A need arises, therefore, for a means for "zeroing" a synchro upon its installation and also from time to time thereafter and heretofore has been accomplished by connecting a volt meter across stator terminals $S_1$ and $S_3$ and obtaining a zero reading (by turning the rotor relative to the stator) when the voltage at stator terminal $S_2$ with respect to $S_1$ (or $S_3$) is in phase with that of rotor terminal $R_1$ with respect to rotor terminal $R_2$. In this position the rotor is parallel to the axis of the stator coil $S_2$. Two hook-ups are required for the zeroing of a synchro and the making of a test for electrical zero becomes a tedious and cumbersome operation replete with possibilities of error especially if a number of units are to be zeroed in succession.

A differential synchro is a device similar to a synchro motor or generator and is used in situations where it is desired to have the angular position of an output shaft equal the sum or the difference in the angular positions of two input shafts. Such a unit embodies a stator element constructed like that of a synchro motor or generator, but has a cylindrical rotor element with three windings spaced 120° apart instead of a salient pole rotor with one winding as in a synchro motor or generator. A differential synchro motor or differential synchro generator is in electrical zero position when corresponding coil axes of the rotor and stator elements are parallel.

A synchro control transformer again is not greatly unlike a synchro motor or generator in construction. Its function in a given system is not to repeat a shaft position but to produce an error voltage or an error signal when an error in alignment between its shaft and the generator shaft exists. The control transformer is provided with a primary three coil stator element and a secondary single coil cylindrical rotor element. Electrical zero for a control transformer may be only one of two zero-rotor-voltage positions obtained when the stator is connected to a generator that is set in its known electrical zero position. A zero-rotor-voltage position of a control transformer has been selected as that position wherein the axis of the rotor coil is perpendicular to the axis of stator coil S2, and in this position minimum voltage is induced in the rotor coil.

Any given system, however, may comprise two or more units of the above description, each unit requiring its own special types of hookups for zeroing which means not only a long and tediously performed series of testing, but a testing replete with possibilities of error.

The present invention undertakes to effect the zeroing of any one of the foregoing or similar instruments with facility and certainty in the accuracy of results. These ends are achieved by providing a compactly arranged testing kit having numbered leads, switches, dials and indicators, by means of which any one of a plurality of different types of synchros may be quickly connected and the unit tested and adjusted, when necessary, to its electrical zero position.

In carrying forward the invention, it is proposed to provide a dial type of gang switch having as many positions as there may be synchros of different kinds to be tested. From this switch run clip leads marked R1, R2, R3, S1, S2, S3 to the exterior of a suitable case or box. The other sets of terminals of the gang switch are interconnected within the box in a manner forming the various testing circuits required for the several different synchros. These different circuits include a Null-Selector switch which may be thrown to one position identified as Coarse, to determine whether the unit is electrically in phase or out-of-phase by 180°; if in-phase or nearly so, the Null-Selector switch is thrown to another position identified as Fine and by reference to an indicator, the body of the synchro is carefully rotated until the indicator shows electrical zero position. If the synchro clocks 180° out-of-phase in the Coarse position, the rotor is turned relative to the stator and then the test for electrical zero is made. In conjunction with this mechanism means are provided to obtain first a reasonably close electrical zero indication, and second, an extremely accurate electrical zero indication, referred to hereinafter as High scale and Low scale, respectively. The testing unit also embodies an On and Off switch, power cord for regular external service and with means for taking power service from terminal strips of a synchro system. Plug jacks are also provided for connecting in an external vacuum tube volt meter, into the indicating circuit and all resistances, fuses and switches are preferably wired so as to form a number of selectively available circuits necessary in testing out a synchro motor, generator, differential motor or generator, or control transformer for their respective electrical zero positions.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figures 1 and 2 of the drawings illustrate, respectively, a front and a side view of a synchro zero indicator assembly constructed in accordance with this invention.

Figures 3, 4, and 5 are, respectively, front, plan (in part) and rear views of a representative gang switch that may be used.

Figure 6 is a line diagram of the elements and circuits embodied in the indicator unit illustrated in Figure 1.

Figures 7 and 8 illustrate, respectively, a synchro generator or motor in electrical zero position and in a position of ambiguity, i. e., 180° out of phase with electrical zero position. The applied voltages are assumed to be 115 v. A. C.

Figure 1:
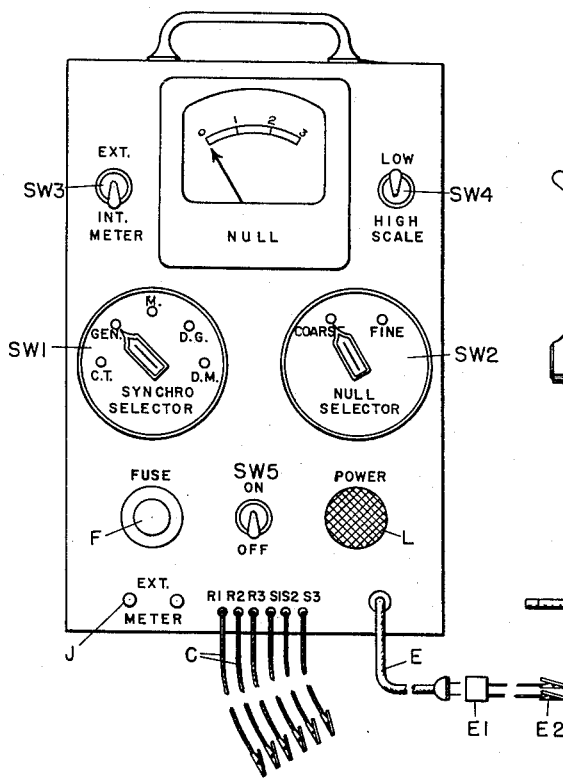

Referring to Figure 1 of the drawings, the synchro zero indicator is illustrated completely assembled in the form of a small carrying case about the size of a shoe box. The front face of the case forms a panel which mounts the various control dials, switches, indicators, power terminals and six clip leads preferably marked in correspondence with the terminal markings of a conventional synchro.

A synchro selector switch is indicated at SW1 and is adapted for hand adjustment to several positions each marked or identified a particular type of synchro to be zeroed and the proper circuitry for the testing is automatically formed, as will be explained, inside the case. The switch SW2 is a Null-detector switch which arranges the circuitry for determining in phase or out of phase relationships as well as electrical-zero positions. Switch S3 is used to obtain readings on the built-in volt meter VM or for switching in an external vacuum tube volt meter, if greater accuracy is required. Switch SW4 is a High and Low Scale switch used to cut-in or cut-out a resistance element in the indicating circuit in obtaining the final high accuracy in the zeroing of a unit. Switch SW5 is a power switch having an "on" and an "off" position. The letter E indicates a power input cord that may, if desired, be equipped with a receptacle E1 and a pair of clip leads E2. The letters F indicate a fuse, L a power-on signal light, and J a pair of output jacks that are provided in the indicating circuit for connecting in an external electronic volt meter with switch SW3. The clip leads are indicated at C, each of which is preferably marked R1, R2, R3 (rotor leads), and S1, S2, S3 (stator leads). The circuit selecting switches SW1 and SW2 each comprises a multiplicity of switch arms and contact points, as illustrated diagrammatically in Figure 6 and which are interconnected as in Figure 6.

When the switches are actuated to their respective operative positions, rearranges a plurality of groups of circuits and connections are made whereby properly to apply the proper ambiguity eliminating voltages to the output clip leads and to the synchro connected therewith and thereafter properly to apply proper voltages to the synchro to obtain the final and precise electrical zero adjustment of devices such as a synchro control transformer, synchro generator, and synchro differential generator. With any given synchro one group of circuits is automatically arranged to determine ambiguity in null location, and another group arranges the circuitry for precise null adjustment. In addition, circuitry is also provided for applying electrical zero voltages to receivers such as a synchro motor and a synchro differential motor to cause their rotors to take up an electrical zero position.

In general, zeroing a synchro means the making of an adjustment between the rotor and stator such that it will respond properly in a system in which all the other synchros are zeroed. Usually a synchro is zeroed by loosening its mounting flange and turning the body and reclamping in electrical zero position. In some cases it might be possible to loosen a shaft coupling, or remove an intermediate gear in the train, and reconnect at the electrical zero position. Use of electrical zero thus affords a universal standard in aligning the synchros of a system. However, the problem existing is to effect the zeroing of the various types in a simple, convenient, and efficient manner with certainty in the results. Each type of synchro requires at least two different hookups, each different from the hookups of other types of synchros, and by the aid of this invention a synchro zero indicator is provided useful to zero the various types in any environment, i. e., field, laboratory, or when initially assembling a synchro system.

Figure 6:
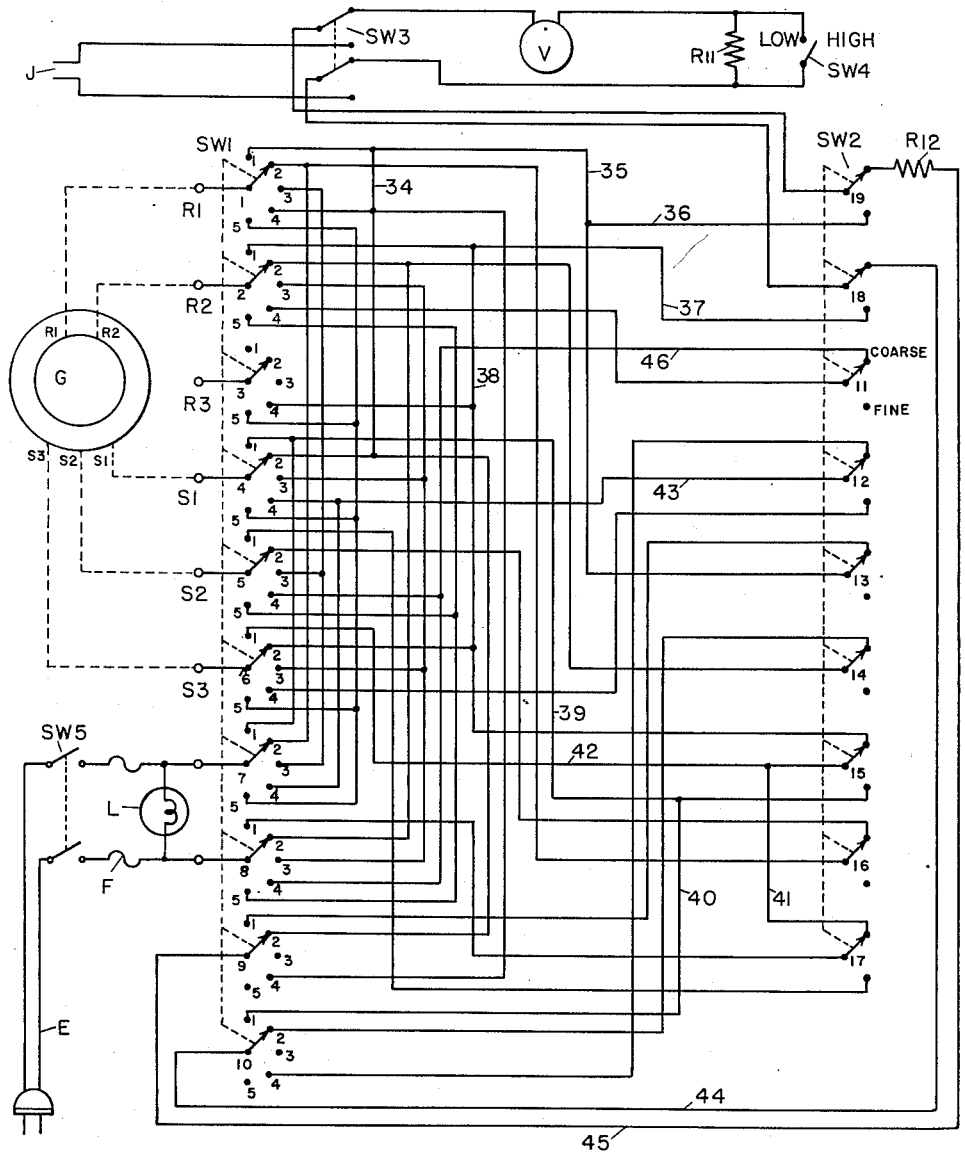

With reference more particularly to Figure 6, the synchro generator G is indicated as connected by the clip leads R1, R2, S1, S2, and S3 to the synchro indicator device. The synchro selector switch SW1 is thrown to the position marked Gen. on its dial. Null-selector switch SW2 is set in its Coarse position (which includes resistances R12). The indicator selector switch SW3 is thrown to its internal meter side which places the volt meter VM in the circuit and scale switch SW4 is thrown to its High scale position which includes resistance R1 in series with the volt meter and when the reading later obtained is below 3 volts the switch is thrown to Low scale position to obtain the final Null. The lead cord is plugged into a source of current (synchro excitation) and then the power switch is thrown to "on" position, the lamp L lights up and the following circuits are made with the synchro: The excitation at switch 7, station 2, flows to station 2 of switch 1 and rotor terminal R1. The excitation current at switch 8—2 flows to switch 2—2 and rotor terminal R2. Stator terminal S1 is connected with switch 4—2 to switch 9—2, line 45, resistance R12, switch 19-Coarse, meter switch SW3 to the volt meter VM via resistance R11. Thence, via the other set of contacts of switch SW3, to switch 18-Coarse, line 44 to switch 10—2, to switch 14-Coarse, to switch 2—2 and the power at switch 8—2. Stator coil S2 connects with switch 5—2 to switch 16-Coarse, to switch 1—2 and the line 41 power at switch 7—2. Stator coil S3 is in an open circuit including switch 6—2, line 42 to switch 15-Coarse, line 41 to switch 17-Coarse, to switch 8—1 which are open as are also switches 3—3, 2—1, and 18-Fine that interconnect.

The circuitry thus arranged within the indicator connects the stator terminals S1 and S2 of the synchro with rotor terminals R2 and R1 respectively and the power source, with the meter VM in series with S1 and R2. If the meter reading is minimum the synchro shaft is quite close to the electrical zero position. If the meter reading is at a maximum the unit is out of phase or 180 degrees away from electrical zero and the relative position of rotor and stator is changed until the meter reads minimum. In this way the circuitry indicates ambiguity in rotor position.

Figures 7, 8:
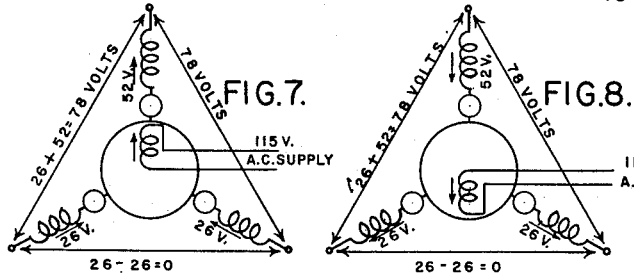
Figure 12:
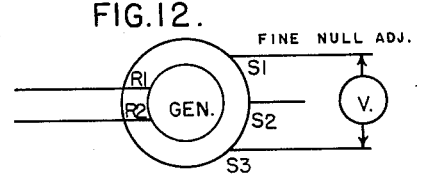

Figures 7 and 8 illustrate a motor or generator in an electrical zero position and in 180 degrees out of phase position and in which a zero reading is indicated across S1 and S3 in either position. However, the connections above explained determines the fact at once and the reorientation, if necessary, is made to the relative position of rotor and stator. After the ambiguity test has been made and the synchro case adjusted to near zero, precision accuracy in the setting is obtained by throwing the Null switch SW2 to Fine and carefully adjusting the relative rotor position until the volt meter reading is zero. When the switch SW2 is thrown from Coarse to Fine position the synchro remains connected to the leads R1, R2, S1, S2 and S3 as before. The movement of switch SW2 to Fine rearranges the circuitry as indicated in Figure 12 and is as follows: On closing switch SW5 power is led through switch 7, point 2: to switch 1—2 and terminal R1, (the connection with switch 16 is open), and power through switch 8—2 is led to switch 2—2 and terminal R2 (the connection with switch 14 is open). Stator coil S1 connects with switch 4—2, lines 34, 35, 36 to 19-Fine, to SW3, to volt meter VM, switch SW3 to switch 18-Fine, lines 37, 38 to switch 6—2 and stator lead S3. The volt meter is then connected across stator terminals S1 and S3 and if the meter does not indicate minimum voltage the rotor or stator is carefully turned until it does. When the minimum or zero voltage is almost obtained the scale switch SW4 is moved to its low scale position to obtain a more sensitive null reading.

When the Null switch SW2 is in Coarse position the meter reading reflects either a Figure 7 position or a Figure 8 position of the rotor relative to the stator and the rotor is turned, if necessary, approximately 180 degrees to record a Figure 7 position. When the Null switch SW2 is thrown to Fine, the final adjustment is made to the rotor or stator until the induced voltages incident to its position reflects an electrical zero voltage reading on the indicator. The synchro is thus quickly brought into its electrical zero position and is said to be "zeroed." If the Coarse volt meter reading is at maximum (rotor out-of-phase 180°) and the Null switch SW2 thrown to Fine at the coarse meter reading shaft position, the correct Fine meter reading would be indicated, but this would mean an out-of-phase adjustment with respect to the electrical zero position.

Once the proper adjustment has been made, the body of the synchro is clamped tightly to its supporting means so that the relation of its shaft position to the position of the output shaft of related or associated gear trains is permanently maintained.

Figure 9:
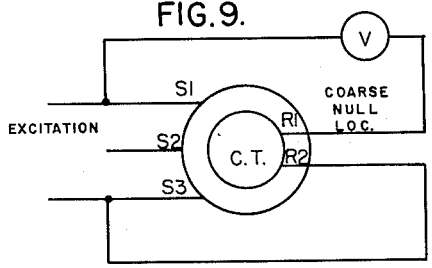
Figures 9 and 10 are diagrammatic illustrations of a synchro control transformer with connections made for Coarse Null location, and Fine Null location, respectively.
Figure 10:
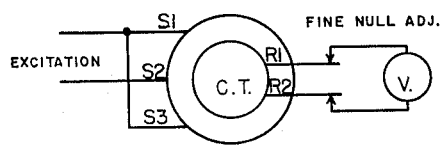
Figure 11:
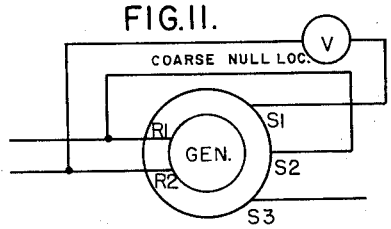
Figures 11 and 12 are diagrammatic illustrations of a synchro generator with connections made for Coarse and Fine Null locations, respectively.

*Control transformer (Figures 9, 10, and 6).—*

When a synchro of this type is to be zeroed, the synchro leads R1, R2, S1, S2, S3 are connected to corresponding terminals of the synchro, and synchro selector switch SW1 thrown to its C. T. position (control transformer Pos. #1) and the Null switch SW2 is first thrown to Coarse. The circuitry thus completed may be traced on Figure 6 as follows: Excitation current at switch 7—1 passes to switch 4—1 to terminal S1, also via lines 39 and 40 to switch 10—1, to 18-Coarse to switch SW3, resistance R11, volt meter VM, switch SW3, switch 19—2, resistance R12, switch 9—1, to 13-Coarse, line 35, to switch 1—1 and terminal R1. The other leg of the excitation current is through switch 8—1 to switch 17-Coarse, lines 41 and 42 to switch 6—1 and terminal S3, also through switch 15-Coarse, line 38, to switch 2—1 and rotor terminal R1. Stator terminal S2 leads to switch 5—1, to switch 17-Fine which is open. This circuitry is represented diagrammatically in Figure 9 wherein the voltmeter is connected across S1 and R1; S3 and R2 are connected, and the exciting current feeds S1 and S3. If the synchro is 180 degrees away from the electrical zero position the meter will show maximum reading and the synchro is adjusted mechanically until minimum reading is indicated. Thereafter the Null Selector switch SW2 is moved to Fine and the groups of circuits are rearranged as follows: Excitation current at switch 7—1 passes to switch 4—1 to stator terminal S1, also via line 39 to switch 15-Fine, line 42 to switch 6—1 and stator terminal S3. Excitation at switch 8—1 transmits to switch 17-Fine to switch 5—1 and to stator terminal S2. Rotor terminal R1 connects with switch 1—1, line 35, 36, to switch 19-Fine to switch SW3 to volt meter VM, switch SW3 to switch 18-Fine, line 37 to switch 2—1 and rotor terminal R2. Thus the proper voltages are automatically applied to the output clip leads to obtain a precise electrical zero adjustment of the control transformer.

Figure 13:
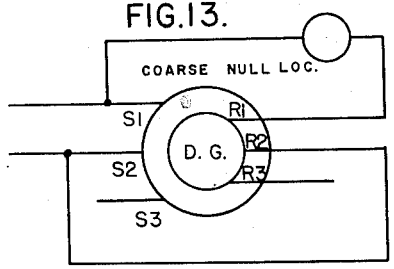
Figures 13 and 14 are diagrammatic illustrations of a synchro differential generator with connections made for Coarse and Fine Null locations.
Figure 14:
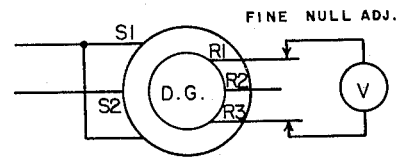

*Differential synchro generator (Figures 13, 14, and 6).*—When this type of synchro is to be zeroed the clip leads R1, R2, R3 and S1, S2 and S3 are connected to the corresponding terminals of the synchro and the selector switch turned to station D. G. (Pos. #4). Switch SW2 is moved to Coarse, and the circuitry is arranged such that the synchro excitation at switch 7—4 passes to switch 4—4 and terminal S1, and also via line 43 to switch 12-Coarse, to switch 10—4, line 44 to switch 18-Coarse, to the indicating circuit and back through switch 19-Coarse, resistance R12, line 45 to switch 9—4, to switch 1—4 and terminal R1. The other leg of the excitation circuit at switch 8—4 passes to switch 5—4, to terminal S2, also, via line 46 to switch 11-Coarse, to switch 2—4 and terminal R2. The connections to terminals S3 and R3 remain open as will be evident in Figure 6. The foregoing circuitry places the indicator (volt meter) across S1 and R1 and with S2 and R2 interconnected as in Figure 13, and the meter should read near minimum if the synchro shaft is in the proper orientation, if the reading is toward maximum, the unit is adjusted. After the initial ambiguity adjustment is made the Null switch SW2 is thrown to Fine and the circuitry is rearranged as follows (see Figures 14 and 6): Excitation at switch 7—4 passes to switch 4—4 and terminal S1, also thru line 43 to switch 12-Fine, to switch 6—4 and terminal S3. Excitation at switch 8—4 passes to switch 5—4 and terminal S2. Rotor terminal R1 connects with switch 1—4, thence via lines 34, 35, 36, to switch 19-Fine and the indicating circuit. The return from the indicating circuit is through switch 18-Fine, lines 37, 38 to switch 3—4 and terminal R3. Terminal R2 thru switch 2—4 is dead at switch 11-Fine. In this rearrangement of circuits the stator terminals S1 and S3 are parallel connected in the circuit with S2, and the indicator VM is connected across rotor terminals R1 and R2. The body of the synchro is thereupon carefully adjusted to electrical zero position.

The indicating circuit above referred to as including switch SW3, resistance R11, volt meter VM and scale switch S4 also includes jack terminals J which may, when desired, be connected to an external indicating means such as a vacuum tube volt meter to obtain greater accuracy in the electrical zero positioning of the body of the synchro. The external meter switch SW3 in the position shown in Figure 6, cuts out the circuit to the jacks J. When the switch SW3 is thrown to its other position the circuit to the internal volt meter is cut out.

Figure 15:
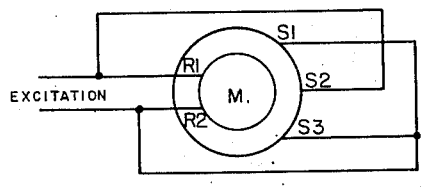
Figures 15 and 16 are diagrammatic illustrations of a synchro motor and a synchro differential motor with connections made for zeroing their respective shafts.
Figure 16:
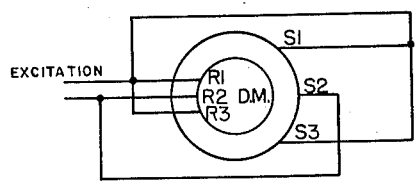

*Synchro motor and differential synchro motor (Figures 15 and 16).*—Receivers of these kinds are quickly and accurately zeroed with this invention by properly applying zeroing voltages to their respective terminals and allowing the rotors to spin to their electrical zero positions and then zeroing their dials. In zeroing these units only the selector switch is used respectively in position M (Pos. #3) and position D. M. (Pos. #5). In the case of a synchro motor (Fig. 15) clip leads R1, R2 and S1, S2 and S3 are connected to their corresponding terminals on the motor. Excitation applied at switch 7—3 passes to switch 5—3 and terminal S2 and also to switch 1—3 and terminal R1. Excitation at switch 8—3 passes to switch 6—3 and terminal S3, and also to switch 4—3 and terminal S1 and to switch 2—3 and terminal R2. By so connecting the synchro motor, proper voltages are applied to its terminals which causes the shaft to spin to exactly electrical zero position and its dial is adjusted to zero reading.

With a differential synchro motor (Fig. 16) the six clip leads are connected to corresponding terminals of the synchro and the selector switch turned to D. M. (Pos. #5). Excitation at switch 7—5 passes to switch 6—5 and terminal S2, and to switch 2—5 and terminal R2. This circuitry properly applies zeroing voltages to the rotor and stator windings of the differential motor which causes its shaft to take up an electrical zero position and its dial is adjusted for zero reading.

Figure 2:
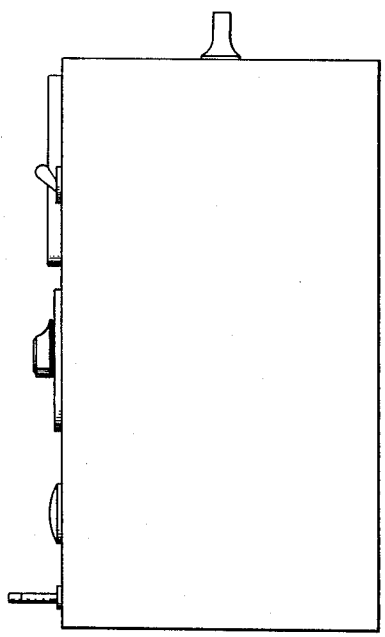
Figures 3, 5:
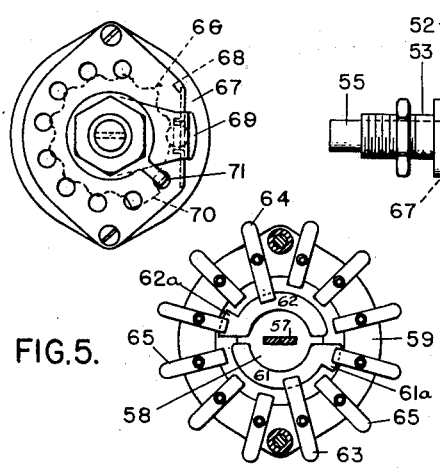
Figure 4:
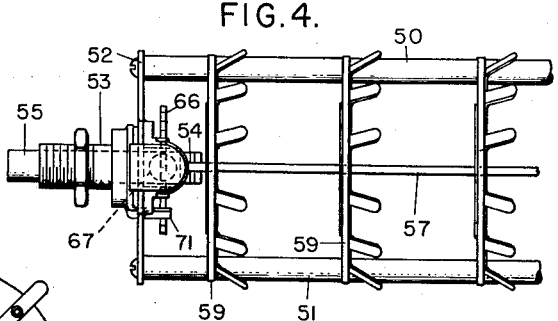

Synchro Selector switch SW1 and the Null Selector switch SW2: The construction of these switches may, of course, take a variety of forms. A compact construction of synchro selector switch is illustrated in Figures 3, 4 and 5, and the Coarse and Fine null selector switch (not shown) may be similarly constructed but with a fewer number of operating positions. In Figures 3–5, the two stabilizing rods 50 and 51 are supported by a panel plate 52 that is provided with a threaded hub 53 by means of which the assembly may be secured in the usual manner to an instrument panel, e. g., the front panel of the case illustrated in Figs. 1 and 2. The hub 53 provides a journal bearing for a rotatable shaft 54 whose projecting end 55 is arranged to carry an operating knob or pointer 56. The inner end of the shaft 54 is flattened as at 57 so that it may carry, in relatively non-rotative relation, one or more spaced apart switch-arm elements 58. The switch arm elements 58 are located in substantially coplanar relation with complemental switch elements 59 that are carried by the stabilizing rods 50 and 51. Figure 5 illustrates more clearly one of the switching sets in which switch element 58 is the movable part and switch element 59 is the stationary part, each element being constructed of fiber or other dielectric material. In this instance the inner movable element 57 carries two semi-circular contact elements 61 and 62 and the outer member 12 carries contact arms, of which two may be regarded as input terminals 63 and 64, and the remainder 65 as output terminals. The input terminals 63 and 64 extend across the air gap between parts 58 and 59 and overlay the semi-circular contacts 61 and 62, one on each. Each semicircular contact 61 and 62 is formed with an integral extension 61a and 62a respectively, arranged so as to be engaged by and form an electrical contact with the arms 65 in succession. In the position indicated in the reverse view Figure 5, the inner contacts have been indexed to a position two stations counterclockwise from the input elements 63 and 64 which corresponds to the position of the dial in Figure 1.

When the dial 56 and shaft 55 are turned, a circuit is completed between terminal arm 63 and one of the output terminals 65 and between arm 64 and another of the output terminals 65. When desired, five circuits may be successively made with each group at each double bank of radiating contacts, or, only one of two. In Figure 4, but three banks or gangs of switches have been illustrated, but it will be apparent that by extending the members 50, 51 and 57 as many banks of switches as may be needed may be assembled and controlled from a single dial knob. In the instant embodiment the switches SW1 and SW2 will comprise five banks and each bank will control two groups of circuits.

Indexing of the switch and the maintaining thereof in set position is controlled by a peripherally notched disc 66 secured to the shaft 54 in cooperation with a relatively fixed spring pressed ball 67. The ball 67 is confined in a housing provided by a turned over portion 68 of the mounting plate 52 and a leaf spring 69 is provided to keep the ball pressed toward the notches in the disc 66. The disc 66 carries an extension 70 positioned to be intercepted by a relatively fixed but adjustable stop 71 so that the starting or ending point of the range of movement of the dial knob and the switches may be determined in accordance with the needs. The synchro selector switch SW1 of the present embodiment is comprised of five double banks of switches making ten groups in all, the groups in each bank having five positions, whereas, the Null Selector switch is also comprised of five double banks but the groups thereof may have but two positions, namely, the Coarse and the Fine position. Both sets of switches are interconnected as explained heretofore in connection with Figure 6, so that when operated to their respective operating positions the circuitry for any one of the systems of Figures 9 to 16, inclusive, is automatically obtained.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A synchro zero indicator combining an instrument panel, a synchro-selector master switch mounted to the panel, said switch comprising a plurality of multiposition switches mechanically connected for simultaneous actuation to effective positions each position being identified with a particular type of synchro, a null detector master switch mounted to the panel, said null-detector switch comprising a plurality of multiposition switches mechanically connected for simultaneous actuation to effective positions corresponding to coarse-null rotor shaft positions and to fine-null rotor shaft positions of a synchro, means including a group of circuits interconnecting said selector switches and said null-detector switches so as to form when said null-detector master switch is in its coarse-null position circuitry for applying ambiguity eliminating voltages to each of the synchro identified with the respective positions of the said synchro-selector switches, means including another group of circuits interconnecting said selector switches and said detector switches so as to form when the null-detector master switch is in its fine-null position circuitry for applying electrical zero voltages to each of the synchros identified with the respective positions of said synchro-selector master switch, a group of synchro leads interconnected with the aforesaid two groups of circuits adapted to be connected to selected terminals of any one of the particular synchros to be zeroed, means including another group of leads interconnected with the aforesaid two groups of circuits for applying excitation current to the synchro that is connected to said synchro leads, and indicating means responsive to the voltages induced in the connected synchro for indicating an ambiguous rotor shaft position when the null-detector switch is in its coarse-null position, and a near zero position when the null-detector master switch is in its fine-null position.

2. The combination of claim 1 in which said group of leads for applying an excitation current to the synchro is provided with means electively operable to receive the excitation current from a synchro system with which the synchro to be zeroed is associated or from a standard receptacle external to the synchro system.

3. The combination of claim 1 in which means is included in the circuitry formed when the null-detector master switch is in its coarse-null position to vary the effective response of the indicating means to the induced voltage relative to the response thereof to the induced voltage when the null-detector switch is in its fine-null position.

4. The combination of claim 3 in which additional means is included in the indicating means connections effective to impose a further variation on the effective response of the indicating means to an induced voltage, and switch means for rendering said additional means selectively effective and ineffective.

5. A synchro zero indicator for use in determining the electrical zero position of the shaft of any one of a plurality of different synchros combining an instrument panel, a synchro-selector control mounted to the panel, said control comprising a series of switches mechanically connected for simultaneous actuation to a plurality of effective positions each identified with one of the different synchros, a null-detector control mounted to the panel and comprising a series of switches mechanically connected for simultaneous operation to a plurality of effective positions corresponding to coarse-null rotor shaft positions and to fine-null rotor shaft positions, means including a group of circuits interconnecting said selector switches and said null-detector switches so as to form when said null-detector control is in coarse-null position proper circuitry for applying ambiguity eliminating voltages to any one of the synchros identified with the positions of said synchro-selector control, means including another group of circuits interconnecting said selector switches and said detecting switches so as to form when the null-detector master switch is in its fine-null position circuitry for applying electrical zero voltages to the synchros identified with the respective positions of said synchro-selector control, a group of synchro leads interconnected with the aforesaid two groups of circuits adapted to be connected to selected terminals of any one of the synchros to be zeroed, means including a set of power input leads interconnected with the aforesaid two groups of circuits for conducting excitation current into the respective circuits and to the synchro to be zeroed, and indicating means responsive to the voltages induced in the synchro for indicating the position of the synchro shaft when the null-detector control is in its coarse-null position, and a near zero position when the null detector control is in its fine-null position, and means for actuating said controls to their respective positions whereby electively to form the proper circuitry for zeroing any one of a plurality of different synchros.

6. The combination of claim 5 including signal means connected across the input power leads for imparting a signal when the current is applied to the synchro.

7. An indicating device for determining the zero position of the shaft of a synchro combining a set of clip leads adapted to be connected to the terminals of the particular synchro to be zeroed, a group of null-detector switches mechanically connected for simultaneous operation, each switch of the group having a coarse-null position and a fine-null position, means including a first group of circuits interconnecting the coarse-null position terminals of each of said detector switches with a selected clip lead of the set whereby circuitry is arranged for the application of proper ambiguity eliminating voltages to the said particular synchro, a second group of circuits interconnecting the fine-null position terminals of each of said detecting switches with a selected clip lead whereby a different circuitry is provided for the application of electrical zero voltages to that particular synchro, means associated with each of said groups of circuits for applying an energizing voltage to the synchro, and indicator means responsive to a voltage induced by the synchro for indicating the shaft position of the synchro when said null detector switches are in their coarse-null and fine-null positions respectively.

8. The combination of claim 7 in which the circuitry arranged for the application of proper ambiguity eliminating voltages to the synchro includes a resistance element effective upon the indicator means when the null-detector switches are in their coarse null positions and ineffective upon said indicator means when the null detector switches are in their fine-null positions.

9. The combination of claim 7 in which said means responsive to a voltage generated by the synchro is embodied in an indicating circuit which includes therein a resistance element and a high-and-low scale switch connected in parallel, and means for actuating said scale switch whereby selectively to include and exclude the resistance element from the indicating circuit.

10. An indicating device for determining the zero position of the shaft of a synchro combining a group of clip leads adapted to be connected to the respective terminals of the synchro to be tested, a group of null detector switches mechanically connected for simultaneous operation, each of the switches of the group having a coarse-null position and a fine-null position, means including a resistance element and a first group of circuits interconnecting the resistance element and the coarse-null positions of said detector switches with certain selected clip leads of the group whereby to form proper circuitry for the application of ambiguity eliminating voltages to the terminals of that particular synchro to be tested, and a second group of circuits interconnecting the fine-null positions of said detector switches with certain selected clip leads whereby to form the proper circuitry for the application of electrical zero voltages to the terminals of that particular synchro, means for applying an energizing voltage to the synchro when the null detector switches are in either their coarse- or fine-null positions, and indicator means responsive to the induced synchro voltage for indicating the shaft position of that synchro when said null detector switches are in their coarse-null and fine-null positions respectively.

11. In a synchro zero indicator for use in zeroing a synchro a multiple position switch operative to complete portions of testing circuits to selected terminals of the synchro in accordance with the type of synchro to be zeroed comprising a series of relatively stationary current carrying elements and a cooperatively related movable current carrying element, and at least one of said stationary elements being positioned in electrical contact with said movable element in all operative positions of the latter, and said movable element having a portion thereof constructed and arranged to engage but one of the remaining stationary elements in any given position of the movable element so that a circuit to said one stationary element may be successively switched to any of the other stationary elements on actuating the said movable element, a set of synchro leads adapted to be connected to terminals of a synchro to be zeroed, and a series of circuits forming means interconnecting said synchro leads with the current carrying elements of said multiple position switch so as to form in each effective position of the multiple switch the circuitry for applying zeroing voltages to a synchro in accordance with the type of synchro connected to said leads.

12. A synchro zero indicator of the character defined in claim 11 in which the stationary current carrying elements of the multiple position switch are arranged in groups with a movable current carrying element cooperatively associated with each of the said groups.

13. A synchro zero indicator for use in zeroing any one of a plurality of different types of synchro units combining a synchro-selector switch having an operative position identified with each of several different types of synchros and a null-detector switch having operative positions identified with coarse-null and fine-null positions of the shaft of a synchro, a set of leads adapted to be connected to terminals of a synchro to be zeroed, circuit forming means interconnecting said switches and said leads operative when the null-detector switch is in its coarse-null position to form the proper ambiguity-eliminating circuit for the synchro identified with each of the positions of the synchro-selector switch and when said null-detector switch is in its fine-null position to form the proper electrical-zero circuit for the synchro identified with each position of said synchro-selector switch, and means operatively connected with said circuits for indicating positions of ambiguity and of electrical zero of the shaft of the synchro when said synchro selector switch is in its position identified with the type of synchro that is connected to said leads.

14. The combination of claim 13 in which said indicating means is included in a circuit having switch means therein for rendering the said indicating means selectively effective and ineffective.

References Cited in the file of this patent

UNITED STATES PATENTS

| Number | Name | Date |
|---|---|---|
| 2,449,083 | Muir | Sept. 14, 1948 |
| 2,609,435 | Gerth | Sept. 2, 1952 |